Feb. 9, 1937.   F. HORAK   2,070,082
KETTLE DRUM
Filed July 14, 1936   3 Sheets-Sheet 1
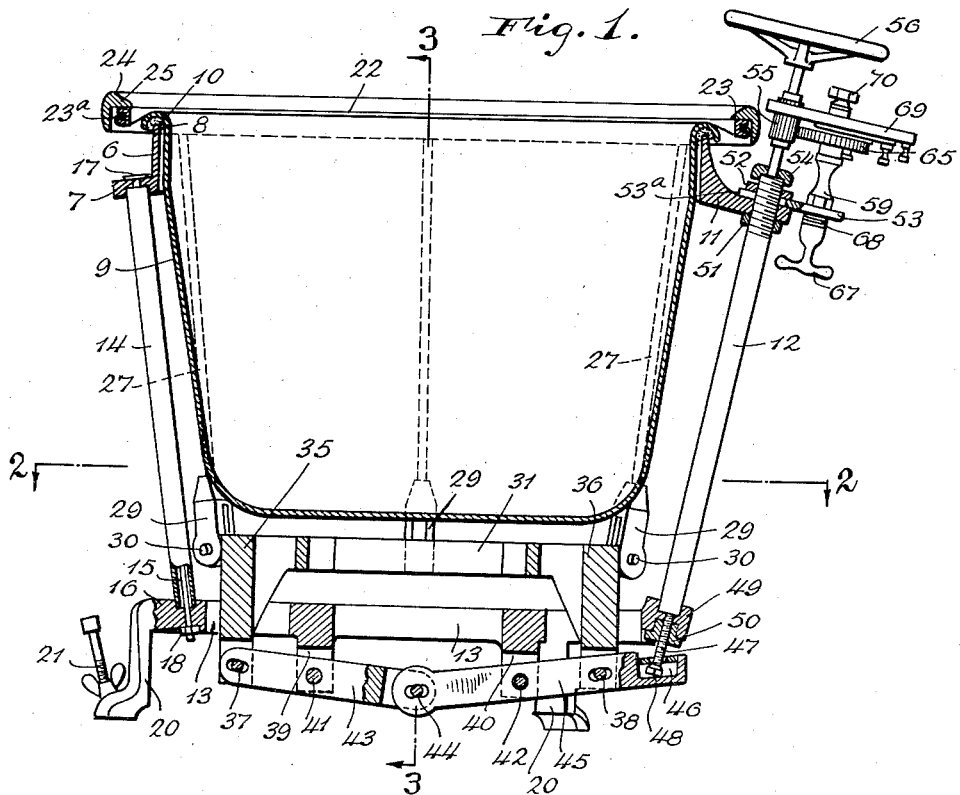
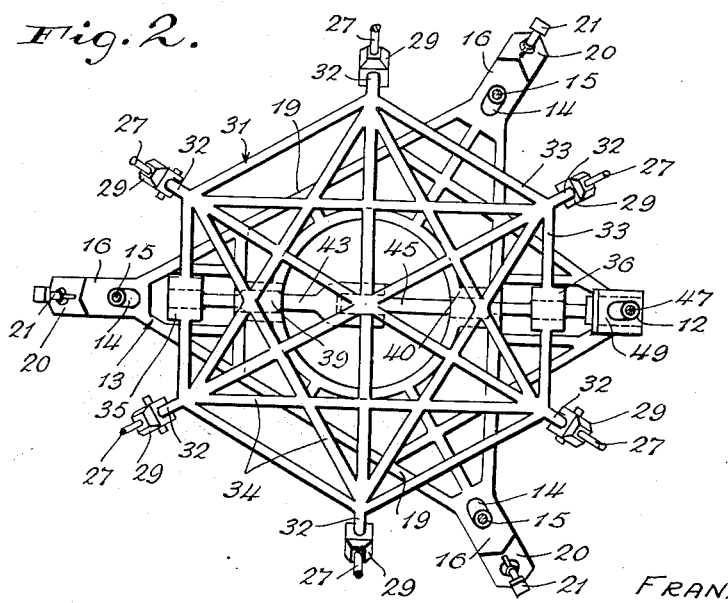
INVENTOR.
FRANZ HORAK
BY Richards & Geier
ATTORNEYS Feb. 9, 1937.  F. HORAK  2,070,082
KETTLE DRUM
Filed July 14, 1936  3 Sheets-Sheet 2
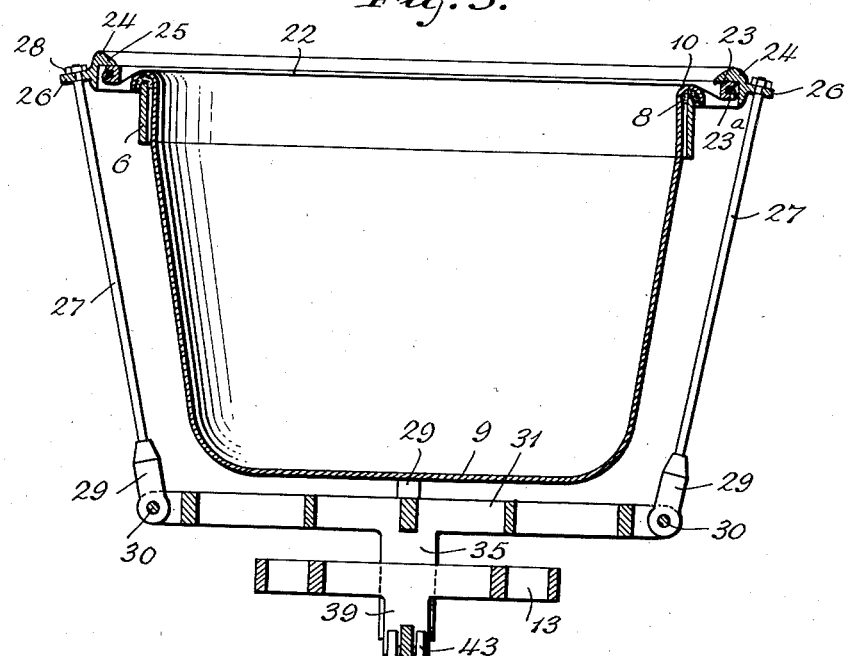
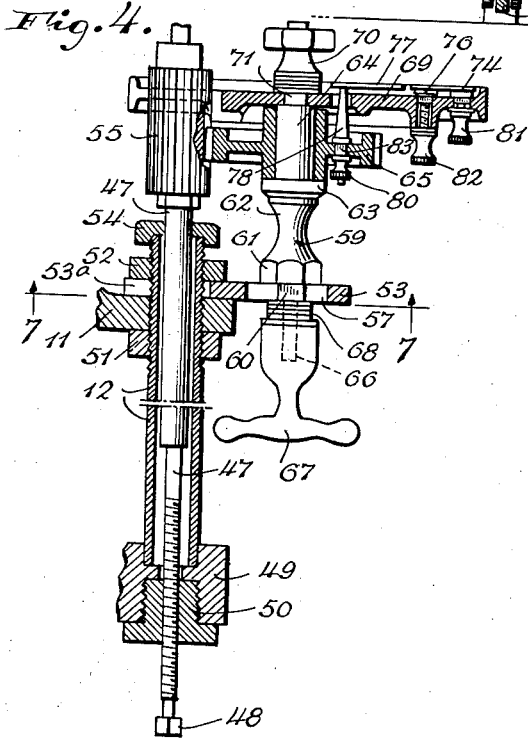
INVENTOR.
FRANZ HORAK Feb. 9, 1937.  F. HORAK  2,070,082
KETTLE DRUM
Filed July 14, 1936  3 Sheets-Sheet 3

Inventor:
FRANZ HORAK
By Richards Geier
ATTORNEYS

Patented Feb. 9, 1937

2,070,082

UNITED STATES PATENT OFFICE 2,070,082

KETTLE DRUM

Franz Horak, Zurich, Switzerland

Application July 14, 1936, Serial No. 90,510
In Switzerland July 4, 1935

5 Claims. (Cl. 84—419)

This invention relates to drums, and refers more particularly to a kettle drum.

An object of the present invention is the provision of a kettle drum comprising means for quickly and easily adjusting the same.

Another object is the provision of a kettle drum comprising a note indicator, said kettle drum being easily set in tune in accordance with the prevailing temperature.

A further object is the provision of a kettle drum having a chromatic scale indicator of small dimensions, through the use of which the drum may be tuned very quickly to the desired pitch.

A still further object of the invention is the provision of a kettle drum, the tone range of which includes at least an entire chromatic octave.

The above and other objects of the present invention may be realized through the provision of a kettle drum, the diaphragm or drum-head of which is stretched by a U-shaped ring and the edges of a kettle, the position of the ring relatively to the kettle being adjustable by means of an adjusting mechanism situated at the sides of and below the kettle and provided with an adjustable scale upon which is indicated the position of the adjusting mechanism corresponding to a certain pitch.

The invention will appear more clearly from the following detailed description when taken in connection with the accompanying drawings showing by way of example a preferred embodiment of the inventive idea.

In the drawings:

Figure 1 is a vertical section through the kettle drum constructed in accordance with the principles of the present invention, some parts being shown in side elevation;

Figure 2 is a horizontal section along the line 2—2 of Fig. 1;

Figure 3 is a vertical section along the line 3—3 of Fig. 1;

Figure 4 is a vertical section through a portion of the adjusting device on an enlarged scale; and Figure 5 is a top view of the adjustable scale.

Figure 6:
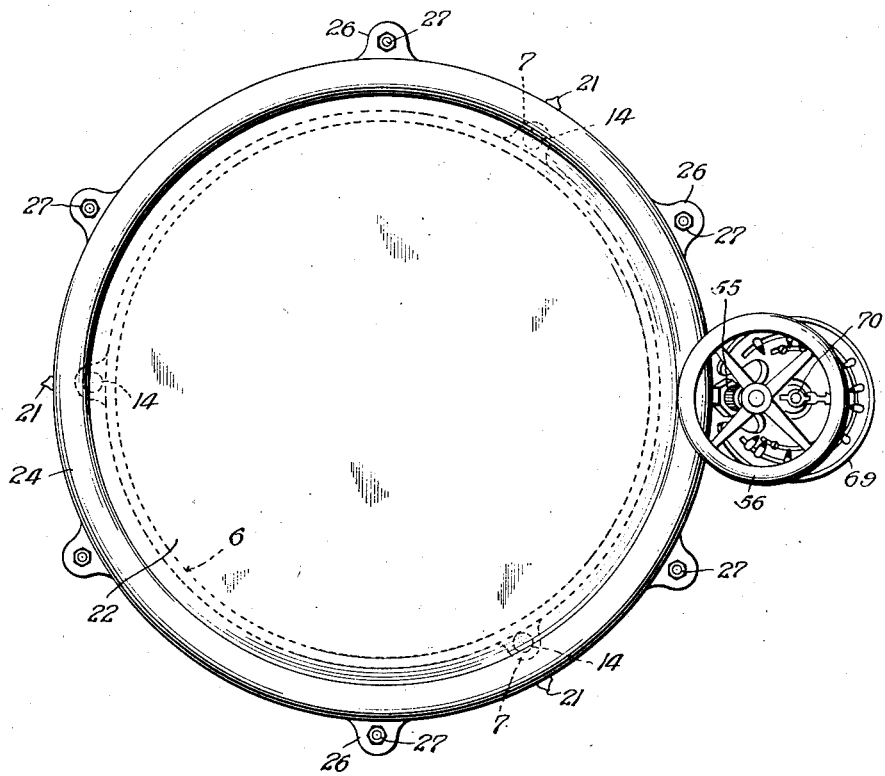
Figure 6 is a top view of the kettle drum.
Figure 7:
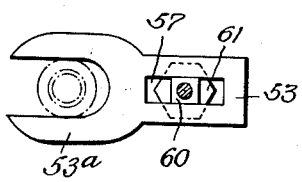
Figure 7 is a section along the line 7—7 of Figure 4.

The kettle drum illustrated in the drawings comprises a ring 6 situated in the upper part of the drum and having three lugs 7. The ring 6 extends in a vertical direction while the lugs 7 which constitute an integral part of the ring 6, extend sidewise and are situated at equal distances one form the other.

A strip of felt 8 is carried by the upper edge of the ring 6 and is firmly connected therewith by gluing or the like.

The kettle 9 comprises side walls situated within the ring 6. The upper bent edge 10 of the kettle 9 is U-shaped in cross-section and is placed over the strip of felt 8 carried by the ring 6, so that the kettle 9 is carried by the ring 6.

A lug or projection 11 which constitutes an integral part of the ring 6 is situated between two lugs 7. The projection 11 has an opening through which passes a tube 12, as will be described in detail hereinafter.

The ring 6 which carries the kettle 9 is supported upon the frame or support 13 by the distancing tubes 14 and the bolts 15. There are three distancing tubes 14 (Fig. 2), each of which is in engagement with a separate lug 7.

As shown in Fig. 1, the upper end of a distancing tube 14 is situated in a cavity formed in the lower portion of the lug 7. The lower portion of the distancing tube 14 is situated in a cavity formed in a plate 16 constituting an integral part of the support 13.

The bolt 15 has the form of a rod situated in the interior of the tube 14 and passing through suitable bore holes formed in the lug 7 and the plate 16. The upper end of the rod 15 has the form of a disk 17 which is placed upon the upper surface of the lug 7. The opposite end of the rod 15 is threaded and carries a nut 18.

The ring 6 and the kettle 9 carried thereby are firmly supported upon the frame 13 by the three distancing tubes 14.

As shown in Fig. 2, the support 13 which has the form of a triangle, comprises three plates 16 interconnected by the cross bars 19. Each of the plates 16 is bent to form a leg 20 carrying adjusting screws 21, by means of which the position of the kettle drum upon a supporting surface may be conveniently adjusted.

The drum-head 22 extends over the bent edges 10 of the kettle 9 and is passed over a ring 23 which is provided with an annular groove 23a formed upon the outer side surface of the ring, so that the latter is U-shaped in cross-section. The abutting edges of the drum-head 22 are introduced into the groove of the ring 23 and are firmly held therein by any suitable means (not shown). Due to this arrangement, the drum-head 22 cannot tear even if subjected to high tension and such tension is not easily diminished by weather conditions and the like. A tensioning ring 24 is situated adjacent the ring 23 and is provided with a horizontal flange portion 25 which extends over the ring 23. The position of the ring 24 relatively to the ring 6 may be changed by a device which will be described hereinafter, and it is this movement of the ring 24 which causes an increase or decrease in the tension of the drum-head 22, thereby varying the pitch of the kettle drum.

The ring 24 is provided with six lugs 26 which are situated at equal distances one from the other and two of which are shown in Fig. 3. Each of the lugs 26 is provided with an opening through which the upper threaded end of a rod 27 is passed; this end carries a nut 28 which presses against the underlying surface of the lug 26. The rod 27 is provided with a shoulder upon which the lug 26 rests. The ring 24 is supported by six rods 27 each of which passes through a separate lug 26.

The lower end of each rod 27 is firmly connected with one end of a separate link 29, the opposite end of the link being bifurcated and carrying a pivot 30.

As shown in Fig. 2, there are six links 29, each of which is connected by means of a pivot 30 with an end 32 of a tensioning frame 31 which is situated above the support 13. The six ends 32 of the tensioning frame 31 are connected with each other by means of outer bars 33 and inner bars 34, so that the frame 31 has the form of a hexagon.

As shown in Figs. 1 and 2, the frame 31 comprises two downwardly-projecting portions 35 and 36, the lower ends of which are bifurcated and carry the pins 37 and 38, respectively. The frame 13 comprises two downwardly-projecting supports 39 and 40 which carry the pins 41 and 42, respectively. A lever 43 is rotatably mounted upon the pin 41. One end of this lever is provided with an opening through which the pin 37 is passed. The opposite end of the lever 43 is bifurcated and carries a pin 44.

Another lever 45 is rotatably mounted intermediate its ends upon the pivot 42. One end of this lever fits between the prongs of the bifurcated lever 43 and is provided with an opening through which the pin 44 is passed. The pin 38 is passed through another opening provided in the lever 45. The levers 43 and 45 connect the tensioning frame 31 with the supporting frame 13.

The outer end of the lever 45 extends beyond the pin 38 and is provided with a cavity or groove 46. The lower end of a spindle 47 which is situated in the cavity 46 carries a head piece 48 which is guided within the groove 46, and which is prevented by the side walls of the groove 46 from leaving the groove when the spindle 47 is moved upwardly. These side walls of the groove 46 may be made from a separate piece which is firmly connected with the lever 45 after the insertion of the head piece 48 into the cavity 46. Due to this arrangement, the upward or downward movement of the spindle 47 will cause a rotation of the lever 45 which will be transmitted to the lever 43 and the tensioning frame 31, and by means of the rods 27 to the ring 24, thereby increasing or decreasing the tension of the drum-head 22.

The support or frame 13 comprises a projecting portion 49 having a bore hole into which the lower end of the tube 12 is inserted. The spindle 47 which is situated inside the tube 12 extends through the projection 49 and is provided with screw threads engaging the inner screw threads of a closure member 50 which is situated within the projection 49 and is firmly connected therewith.

The upper end of the tube 12 is threaded and carries a nut 51 situated below the projection 11. Another nut 52 is screwed upon the tube 12 above the projection 11 and presses against the plate or support 53 which is situated upon the upper surface of the projection 11. As shown more clearly in Figure 5 of the drawings, the plate 53 is provided with two prongs 53a extending on both sides of the tube 12.

A cup-shaped nut 54 is screwed upon the upper open end of the tube 12 and closes this end. The cup-shaped nut 54 comprises a central opening, through which the spindle 47 is passed.

A pinion 55 is mounted upon the spindle 47 adjacent the upper end thereof and is rotatable along with the spindle. The upper end of the spindle 47 carries a hand wheel 56.

The scale support 53 is provided with a slot 57. As shown in Fig. 4, a scale carrier 59 has a rectangular portion 60 fitting into the opening 57, a hexagonal portion 61 and a column 62 situated above the portion 61. The upper portion of the scale carrier 59 comprises a shoulder 63 and a cylinder 64. A toothed wheel 65 is freely mounted upon the cylinder 64 and is carried by the shoulder 63. The toothed wheel 65 meshes with the pinion 55 and is driven thereby.

The lower end of the scale carrier 59 has the form of a bolt 66, upon which the handle 67 is screwed. Leather washers 68 carried by the handle 67 are situated between this handle and the support 53.

The scale plate 69 is carried by the cylinder 64 of the scale carrier 59 and is firmly held upon the carrier 59 by means of a winged nut 70 which is screwed upon the threaded upper end 71 of the carrier 59. The end 71 of the scale carrier 59 has a smaller diameter than that of the cylinder 64 and passes through a suitable opening formed in the scale plate 69.

As shown in Figure 5 of the drawings, the scale plate 69 has the form of a disk provided with a cut-out portion 72. A C-shaped slot 73 extends substantially around the periphery of the plate 69. Individual full tone indicators or markers 74 are carried by the plate 69 and have projecting portions 81 extending through the slot 73 and below the plate 69 (Figure 4). A second C-shaped slot 75 which has a diameter smaller than that of the slot 73 carries the individual half-tone indicators or markers 76 provided with projecting portions 82.

An indicator 77 having the form of an arrow is situated over the plate 69 and is carried by a conical vertical support 78 which projects through a third innermost C-shaped slot 79 formed in the plate 69. The support 78 has a rectangular portion 83 which fits into an opening formed in the toothed wheel 65 and carries a nut 80.

In order to adjust the pitch of the kettle drum it is necessary to turn the wheel 56. Since the spindle 47 is firmly connected with the wheel 56 and meshes with the screw threads of the member 50, a rotation of the wheel 56 will cause a movement of the spindle 47 in the direction of its longitudinal axis. Since the end 48 of the spindle 47 is enclosed by the walls of the cavity 46, both the upward and the downward movement of the spindle 47 in the direction of its longitudinal axis will cause a movement of the lever 45. This rotation of the lever 45 is transmitted to the lever 43 which is connected by the pin 44 with the lever 45. The two levers 43 and 45 will swing about their pivots 41 and 42 respectively, thereby moving the support 31 which is connected with the levers 43 and 45 by the pins 37 and 38, in a vertical direction. The support 31 carries the rods 27 which are connected by the lugs 26 with the ring 24. Therefore, the rotation of the wheel 56 will be transmitted to the ring 24 and will cause either an upward or a downward movement of this ring. The ring 24 is in contact with the ring 23 over which the drum-head 22 is stretched, said drum-head being supported by the edges 10 of the kettle 9 so that the movement of the ring 24 will either diminish or increase the tension of the drum-head, thereby changing its pitch.

Since the pinion 55 is rotatable along with the spindle 47, the rotation of the spindle will be transmitted to the toothed wheel 65, which rotates along with the indicator 77. When the tone of the drum-head 22 has been adjusted to the desired pitch, the indicator 77 points in a certain direction. Then the musician shifts the corresponding full tone indicator 74 upon the plate 69 to a position opposite the indicator 77.

The described kettle drum may be adjusted from the low E over the higher E to the higher G.

Normally, if the kettle drum has not been used for a considerable time, the tension of the drum-head 22 will be considerably diminished. Then it is necessary to bring the pinion 55 out of engagement with the toothed wheel 65 and to operate the hand wheel 56, comparing the pitch of the drum-head 22 with the tuning fork until the drum is in proper pitch. Then the toothed wheel 65 is again brought into contact with the pinion 55 and the corresponding tone indicator 74 is placed opposite the indicator 77 carried by the wheel 65. As soon as this has been accomplished the kettle drum may be easily adjusted to any other pitch.

It is possible to manufacture smaller kettle drums having a smaller range of tones, for example, ranging from a low E to the higher E.

What is claimed is:

1. A kettle drum, comprising a ring, a kettle carried by said ring and having upper edges, another ring situated over the first-mentioned ring, a drum-head stretched over the second-mentioned ring and said edges of said kettle, a support, distancing tubes connected with said support and the first-mentioned ring and supporting the first-mentioned ring, a third ring having a horizontal surface engaging the second-mentioned ring, a movable frame, means connecting said movable frame with the third-mentioned ring, a lever pivotally mounted in said support and connected with said frame, and an adjusting mechanism having a member engaging said lever for moving the same.

2. A kettle drum, comprising a kettle, a ring, a drum-head stretched over said ring and the edges of said kettle, a support, means connected with said support and supporting said kettle, another ring having a surface engaging the first-mentioned ring, a movable frame, means connecting said movable frame with the second-mentioned ring, a lever pivotally mounted in said support and connected with said frame, a movable spindle having one end connected with said lever, and means connected with said support and the first-mentioned means for guiding and supporting said spindle, a movement of said spindle in the direction of its longitudinal axis being transmitted to said lever, said frame and the second-mentioned means to the second-mentioned ring, thereby adjusting the tension of said drum-head.

3. In combination with a drum-head, means for stretching said drum-head, a movable spindle having a threaded portion, supporting means engaging said threaded portion of the spindle, whereby said spindle when rotated is moved in the direction of its longitudinal axis, and tensioning means connecting the first-mentioned means with said spindle, whereby a movement of said spindle in the direction of its longitudinal axis is transmitted to the first-mentioned means to adjust the tension of said drum-head; an indicating device comprising a pinion mounted upon said spindle and rotatable therewith, a scale carrier, a gear wheel mounted upon said scale carrier and meshing with said pinion, a scale, and an indicator cooperating with said scale and rotatable along with said gear wheel.

4. In combination with a drum-head, means for stretching said drum-head, a movable spindle having a threaded portion, supporting means engaging said threaded portion of the spindle, whereby said spindle when rotated is moved in the direction of its longitudinal axis, and tensioning means connecting the first-mentioned means with said spindle, whereby a movement of said spindle in the direction of its longitudinal axis is transmitted to the first-mentioned means to adjust the tension of said drum-head; an indicating device comprising a pinion mounted upon said spindle and rotatable therewith, a scale carrier, a gear wheel mounted upon said scale carrier and meshing with said pinion, a scale having at least two grooves formed therein, a full tone marker guided by one of said grooves and movable upon said scale, a half tone marker guided by the other one of said grooves and movable upon said scale, and an indicator adapted to point to various parts of said grooves and rotatable along with said gear wheel.

5. In combination with a drum-head, means for stretching said drum-head, a movable spindle having a threaded portion, supporting means engaging said threaded portion of the spindle, whereby said spindle when rotated is moved in the direction of its longitudinal axis and tensioning means connecting the first-mentioned means with said spindle, whereby a movement of said spindle in the direction of its longitudinal axis is transmitted to the first-mentioned means to adjust the tension of said drum-head; an indicating device comprising a pinion mounted upon said spindle and rotatable therewith, a scale carrier, a gear wheel mounted upon said scale carrier and meshing with said pinion, a plate, means adjustably supporting said scale carrier upon said plate, means removably connecting said plate with the first-mentioned means, whereby said plate along with said carrier and said gear wheel may be removed and said gear wheel brought out of engagement with said pinion when said spindle is moved to adjust the tension of said drum-head to cause said drum-head to emit a predetermined tone, a scale carried by said scale carrier, a plurality of tone markers carried by said scale, and an indicator adapted to point to one of said tone markers and rotatable along with said gear wheel, whereby the tone of said drum-head may be changed to another tone when said gear wheel meshes with said pinion, by moving said spindle until said tone indicator points to a different tone marker.

FRANZ HORAK.